US006201668B1

(12) United States Patent
Murphy

(10) Patent No.: US 6,201,668 B1
(45) Date of Patent: Mar. 13, 2001

(54) GIMBAL-LEVEL PIEZOELECTRIC MICROACTUATOR

(75) Inventor: James Morgan Murphy, Boulder, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/189,654

(22) Filed: Nov. 10, 1998

Related U.S. Application Data

(60) Provisional application No. 60/062,333, filed on Oct. 14, 1997, and provisional application No. 60/051,694, filed on Jul. 3, 1997.

(51) Int. Cl.[7] .................................................. G11B 5/56
(52) U.S. Cl. .............................................................. 360/294.4
(58) Field of Search ........................................... 360/294.4

(56) References Cited

U.S. PATENT DOCUMENTS

| 5,521,778 | 5/1996 | Boutaghou et al. | 360/106 |
| 5,629,918 | 5/1997 | Ho et al. | 369/112 |
| 5,719,720 | * 2/1998 | Lee | 360/71 |
| 5,764,444 | * 6/1998 | Imamura et al. | 360/109 |
| 5,898,541 | * 4/1999 | Boutaghou et al. | 360/109 |
| 6,002,549 | * 12/1999 | Berman et al. | 360/104 |
| 6,046,888 | * 4/2000 | Krinke et al. | 360/104 |

FOREIGN PATENT DOCUMENTS

| 2 337 848 | * 12/1999 | (GB) . |
| 3-97174 | * 4/1991 | (JP) . |
| 98/27547 | * 6/1998 | (WO) . |

OTHER PUBLICATIONS

Baumgart, P. et al., "A New Laser Texturing Technique for High Performance Magnetic Disk Drives", *IEEE Transactions on Magnetics*, vol. 31, No. 6, pp. 2946–2951 (Nov. 1995).

Chen, H. et al., "Glide Characteristics of a Laser Textured Disk", *IEEE Transactions on Magnetics*, vol. 33, No. 5, pp. 3103–3105 (Sep. 1997).

Kuo, D. et al., "Design of Laser Zone Texture for Low Glide Media", *IEEE Transactions on Magnetics*, vol. 32, No. 5, pp. 3753–3758 (Sep. 1996).

(List continued on next page.)

*Primary Examiner*—William Klimowicz
(74) *Attorney, Agent, or Firm*—Merchant & Gould P.C.

(57) ABSTRACT

A gimbal-level piezoelectric microactuator including monomorphs for the fine positioning of a head-arm assembly of a disk drive. The microactuator is manufactured from a generally flat metal sheet structure having a central beam and two tabs extending from opposite sides of the beam. At least one layer of piezoelectric material is bonded onto each of the two tabs. Each of the two tabs is bent, with the piezoelectric layers bonded thereto, to a position substantially normal to the central beam. The structure is then joined to the distal end of a suspension member of the head-arm assembly. A recording head is connected to the central beam of a gimbal or flexure element and the microactuator is also attached to the flexure element. When a voltage is applied to the piezoelectric materials, deflection of the microactuator occurs, thereby positioning the recording head.

13 Claims, 7 Drawing Sheets

OTHER PUBLICATIONS

Kuo, D. et al., "Laser Zone Texturing on Glass and Glass–Ceramic Substrates", *IEEE Transactions on Magnetics*, vol. 33, No. 1, pp. 944–949 (Jan. 1997).

Lee, J. et al., "The Dependency of Takeoff Velocity and Friction on Head Geometry and Drive Configuration", *Transactions of the ASME. Journal of Tribology*, vol. 117, pp. 350–357 (Apr. 1995).

Tsay, A. et al., "Natural Frequency Analysis of PZT Glide Heads During Contact", *9th International Symposium on Information Storage and Processing Systems*, vol. 4, pp. 91–96 (1998).

Yao, W. et al., "Head–Disc Dynamics of Low Resonance Laser Textures –A Spectrogram Analysis", *IEEE Transactions on Magnetics*, vol. 34, No. 4, pp. 1699–1701 (Jul. 1998).

Yeack–Scranton, C.E., "Novel Piezoelectric Transducers to Monitor Head–Disk Interactions", *IEEE Transactions on Magnetics*, vol. Mag–22, No. 5, pp. 1011–1016 (Sep. 1986).

Hutchinson Technology, product description, "Microactuation Test Platform", Sep. 1997.

Takaishi et al., "Microactuator Control Ffor Disk Drive", IEEE Transactions on Magnetics, vol. 32, No. 3, May 1996.

\* cited by examiner

GIMBAL-LEVEL PIEZOELECTRIC MICROACTUATOR

CROSS-REFERENCE TO RELATED APPLICATIONS

The present invention relates to Provisional Application Ser. No. 60/051,694, filed Jul. 3, 1997, by James Morgan Murphy, and entitled "SUSPENSION-LEVEL PIEZOELECTRIC MICROACTUATOR", application Ser. No. 09/081,393, filed May 18, 1998 by James Morgan Murphy and entitled "SUSPENSION-LEVEL PIEZOELECTRIC MICROACTUATOR", and Provisional Patent Application Ser. No. 60/062,333 filed Oct. 14, 1997 by James Morgan Murphy and entitled "SUSPENSION-LEVEL PIEZOELECTRIC MICROACTUATOR" (POSITIVE-V). The contents of these applications are incorporated by reference herein.

BACKGROUND OF THE INVENTION

1. Field of the Invention

The present invention relates generally to disk drives, and particularly to a gimbal-level piezoelectric microactuator for read/write heads for disk drives.

2. Description of Related Art

One of the main avenues for the increase in storage capacity of disk drives is through reduction of the track pitch of the recorded information. The minimum distance between recorded data tracks is limited by the ability of a voice coil motor (VCM)-actuated servo system to accurately maintain the position of the recording heads over a given track.

The positioning capability of this servo system is limited by its bandwidth, which in turn is constrained by the power available to the VCM and by suspension resonances. The resolution of the actuator's motion is also limited by stiction in the pivot's ball-bearings. Both of these constraints are approaching fundamental limits after which further increase in track density will be not be possible with the current technology.

To improve track density, proposals have been made to implement a second-stage, for fine-positioning, in addition to the first-stage, for coarse positioning. For example, Takaishi et al. propose a secondary microactuator which is built into the head assembly structure, as part of the head mounting block, between the head suspension and the head assembly arm ("Microactuator Control For Disk Drive", Takaishi et al., IEEE Transactions on Magnetics, Vol. 32, No. 3, May 1996). Another secondary actuator arrangement is described in U.S. Pat. No. 5,521,778 to Boutaghou et al., wherein the secondary actuator 30 connects one end of a further arm portion (a load beam 25) to an actuator arm 24 and wherein a slider 26 and head are supported at the opposite end of the load beam 25.

In each of the above-referenced proposed systems, a substantial length of the head support structure is located between the head and the secondary actuator. For example, as shown in FIG. 4 of the Takaishi et al. article, a head suspension, which accounts for a significant portion of the length of the structure supporting the head, extends from the secondary actuator to the head. Similarly, as shown in FIG. 1 of the Boutaghou et al. patent, the load beam 25, which accounts for about one-half of the length of the structure supporting the head, extends from the secondary actuator to the head.

As such, each of these structures may be susceptible to a significant level of structural resonance, upon operation of the secondary actuator. Such resonance tends to result in unwanted head motion, which inherently reduces the accuracy of the positioning operation and, thus, reduces the available track density.

In the related provisional application Ser. No. 60/051,694 referred to above there is disclosed a suspension-level piezoelectric microactuator, which structurally is relatively small and not necessarily compatible with existing disk drive structures. Further, there is a need to improve the flexure of the microactuator and to obtain improved sensitivities, and, consequently, accuracies.

Accordingly, there is a need in the art for a microactuator for supporting and finely-positioning a read and/or write head with sufficient accuracy to operate with a track pitch substantially below that possible with typical VCM servo system operation.

SUMMARY OF THE DISCLOSURE

To address the requirements described above, the present invention discloses a suspension-level piezoelectric microactuator for the fine positioning of a head-arm assembly of a disk drive. The microactuator is manufactured from a generally flat metal sheet structure having a central beam and two tabs extending from opposite sides of the beam. At least one layer of piezoelectric material is bonded onto each of the two tabs. Each of the two tabs is bent, with the piezoelectric layers bonded thereto, to a position substantially normal to the central beam. The structure is then joined to the distal end of a suspension member of the head-arm assembly. A flexure or gimbal plate is affixed to the suspension and a recording head is connected to the flexure or gimbal plate. The microactuator is also attached to the gimbal plate. When a voltage is applied to the piezoelectric materials, deflection of the microactuator occurs, thereby positioning the recording head.

It is an object of the present invention to employ a second-stage, fine-positioning piezoelectric microactuator for positioning one or more heads of a disk drive relative to a recording surface. It is yet another object of the present invention to provide such a piezoelectric microactuator as a relatively small, light-weight device, located with the head and with the flexure plate of a suspension member of the head-arm assembly to exclude suspension resonance. It is a further object of the present invention to provide such a piezoelectric microactuator that is capable of very small movements on the order of at least one half the track width, for example, on the order of at least 0.5 μm for a track pitch of about 1.0 μm. It is yet a further object of the present invention to provide such a piezoelectric microactuator that is capable of nanometer scale movements.

BRIEF DESCRIPTION OF THE DRAWINGS

The file of this patent contains at least one drawing executed in color. Copies of this patent with color drawing (s) will be provided by the Patent and Trademark Office upon request and payment of the necessary fee.

Referring now to the drawings in which like reference numbers represent corresponding parts throughout:

FIGS. 9A, 9B, 9C, 9D, 9E, 9F, and 9G illustrate the construction of the microactuator in relation to the flexure plate, suspension and head, wherein FIG. 9A shows a microactuator etched stainless steel base;

FIG. 9B shows a base sheet with piezo elements bonded on;

FIG. 9C shows side railed formed up;

FIG. 9D shows a vertical z form;

FIG. 9E shows a gimbal tongue welded on;

FIG. 9F shows a microactuator welded to the end of a loadbeam; and

FIG. 9G shows the head attached.

DETAILED DESCRIPTION OF THE PREFERRED EMBODIMENT

Figure 1:
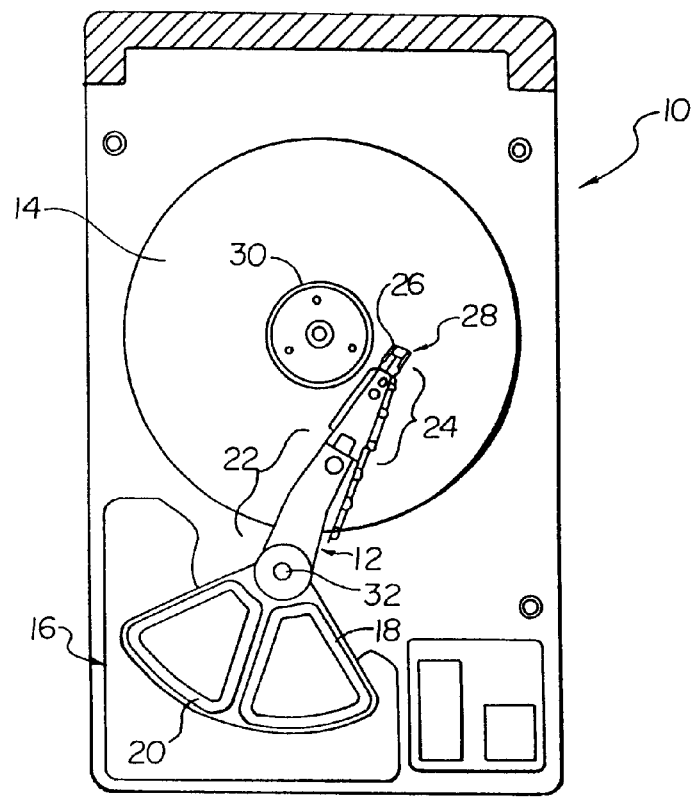
FIG. 1 is a top plan view of a disk drive assembly, wherein a top portion of the assembly has been cut-away to expose a head-arm assembly positioned over a platter.

In the following description, reference is made to the accompanying drawings which form a part hereof, and which show, by way of illustration, several embodiments of the present invention. It is understood that other embodiments may be utilized and structural changes may be made without departing from the scope of the present invention.
Overview The present invention discloses a novel second-stage, fine-positioning, microactuator for use with a read/write head of a disk drive. The microactuator has a much higher bandwidth than VCM actuators, and excludes suspension resonances. The microactuator of the present invention is a very small, lightweight device that is placed between the head and the suspension of the VCM actuator. The microactuator provides only a very small amount of movement—just enough to allow each head to follow its track. For example, only approximately ±0.5 μm of motion is necessary for a disk drive with a 1 μm track pitch (i.e., 25 k tpi track density).
Disk Drive Structure FIG. 1 is a top plan view of a disk drive assembly 10, wherein a top portion of the assembly 10 has been cut-away to expose a head-arm assembly 12 positioned over a platter 14. In addition, a top portion of the magnetic structure assembly 16 is removed in order to expose the coil bobbins 18, 20 of a voice coil motor (VCM) that controls the movement of the head-arm assembly 12. The head-arm assembly 12 includes an arm 22, suspension member 24, microactuator 26, and a read/write head 28 positioned over the platter 14. Generally, a plurality of platters 14 are stacked on a spindle 30 and there are a plurality of head-arm assemblies 12 in an E-block structure to access the platters 14 simultaneously, wherein each head-arm assembly 12 accesses one of two surfaces (top and bottom) of each platter 14.

In the present invention, the head-arm assembly 12 is comprised of both a first stage positioner and a second stage positioner. The first stage positioner comprises the VCM, arm 22, and suspension member 24 that effect rotational movement of the head-arm assembly 12 about a pivot bearing 32 for coarse positioning. The second stage positioner comprises a suspension level piezoelectric microactuator 26 that effects very small, cross-track, movements of the read/write head 28 for fine positioning.

The first-stage positioner positions the read/write head 28 in the vicinity of the desired track of the platter 14. The second stage positioner then precisely aligns the read/write head 28 with the desired track of the platter 14. Thus, the use of the first and second stage positioners allows the disk drive 10 to operate with higher track densities and smaller track pitches than prior art systems.

Figure 2:
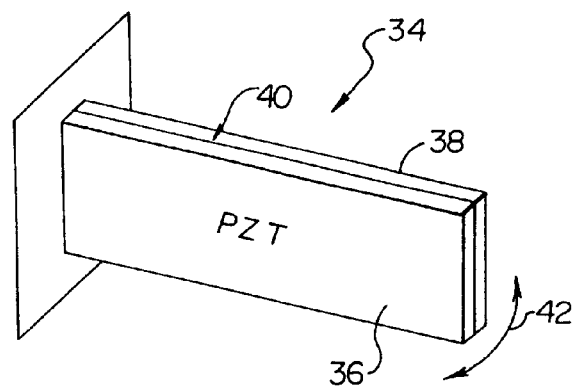
FIG. 2 illustrates a piezoelectric monomorph that may be used to implement the second stage positioner according to the present invention.

For example, the second stage positioner is capable of fine scale movements to define a range of movement in the order of about half the width of the desired track. More specifically, in the preferred embodiment, the second stage positioner is capable of fine scale movements of distances on the order of a nanometer scale to provide an overall movement range of about ±0.5 μm for operation with a track pitch of 1 μm (or a track density of about 25 k tpi). In addition, the second stage positioner provides a much faster response than prior art systems.
Piezoelectric Microactuator FIG. 2 illustrates a piezoelectric monomorph 34 that may be used to implement the second stage positioner according to the present invention. The monomorph 34 is comprised of piezoelectric elements 36, 38 bonded to a thin sheet metal structure 40. Applied voltages cause the piezo elements 36, 38 to expand or contract, which makes the structure 34 bend in much the same way a bimetallic strip does with changes in temperature. The piezoelectric monomorph 34 is fixedly mounted at one end while the opposite end produces the required motion by deflection through the arc labeled as 42. Similarly, the second-stage positioner of the present invention may also use piezoelectric bimorphs, which are comprised of two piezoelectric crystals bonded together that deform in opposite directions to produce a curvature.

The present invention, however, does not directly utilize the displacement the monomorphs 34 produce, but rather their curvature. This is possible by mounting the monomorph 34 such that its ends can rotate but not move. A monomorph 34 by itself would not be stable; it could buckle if subjected to vertical forces. This is why two intersecting monomorphs 34 are used, i.e., to create a more stable structure. Force or stiffness in the direction of deflection is not actually improved by utilizing the monomorph's 34 curvature instead of direct deflection.

Figure 3:
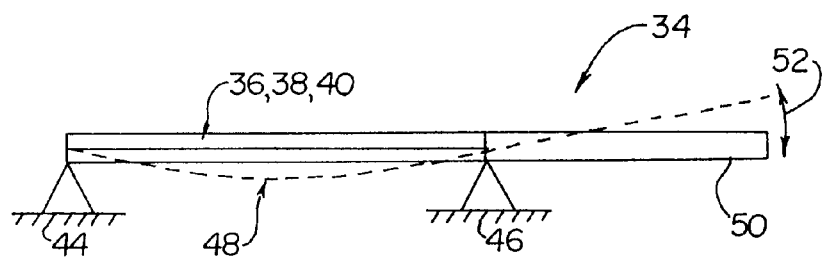
FIG. 3 illustrates a monomorph with pivots at each end.

FIG. 3 illustrates a monomorph 34 with pivots 44, 46 at each end. Voltages are applied to the piezoelectric elements 36, 38 bonded to the thin sheet metal structure 40, which causes the piezo elements 36, 38 to expand or contract. This expansion or contraction causes the structure 34 to bend through the curvature labeled as 48. The bending motion causes deflection in a lever arm 50 attached to one end of the monomorph 34 as indicated by the arc 52.

Figure 4:
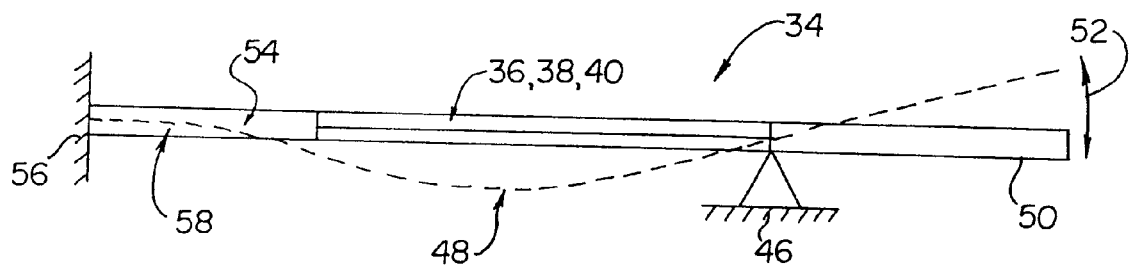
FIG. 4 illustrates a monomorph with one pivot at the end of the monomorph where the lever arm is attached.

For simplicity, however, the microactuator 26 of the present invention may only use a pivot point at one end, and uses an inactive or counter-bending section at the other end to achieve the same effect. FIG. 4 illustrates a monomorph 34 with one pivot 46 at the end of the monomorph 34 where the lever arm 50 is attached. At the other end, the monomorph 34 is attached to an inactive or counter-bending section 54 that is fixedly mounted to a structure 56. Voltages are applied to the piezoelectric elements 36, 38 bonded to the thin sheet metal structure 40, which causes the piezo elements 36, 38 to expand or contract. This expansion or contraction causes the monomorph 34 to bend through the curvature labeled as 48. The bending motion causes deflection in a lever arm 50 attached to one end of the monomorph 34 as indicated by the arc 52. However, the inactive or counter-bending section 54 produces counter-curvature as indicated by the arc at 58.

Figure 5A:
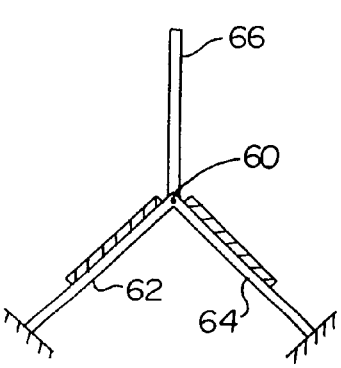
FIG. 5A illustrates another embodiment, wherein a pivot point is created by having two monomorphs intersect at their deflecting ends, such that they prevent each other from deflecting translationally, leaving rotation about the pivot point as the only unconstrained degree of freedom.
Figure 5B:
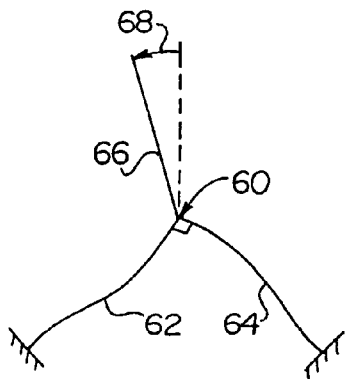
FIG. 5B illustrates the deflection of the lever arm through the arc when voltages are applied to the monomorphs causing them to bend in the manner indicated.

FIG. 5A illustrates another embodiment, wherein a pivot point 60 is created by having two monomorphs 62, 64 intersect at their deflecting ends, such that they prevent each other from deflecting translationally, leaving rotation about the pivot point 60 as the only unconstrained degree of freedom. A lever arm 66, to which the read/write head 28 is attached, is connected to this pivot point 60 and converts the rotation produced thereby into a translation at the head 28. FIG. 5B illustrates the deflection of the lever arm 66 through the arc 68 when voltages are applied to the monomorphs 62, 64 causing them to bend in the manner indicated.

Figure 6:
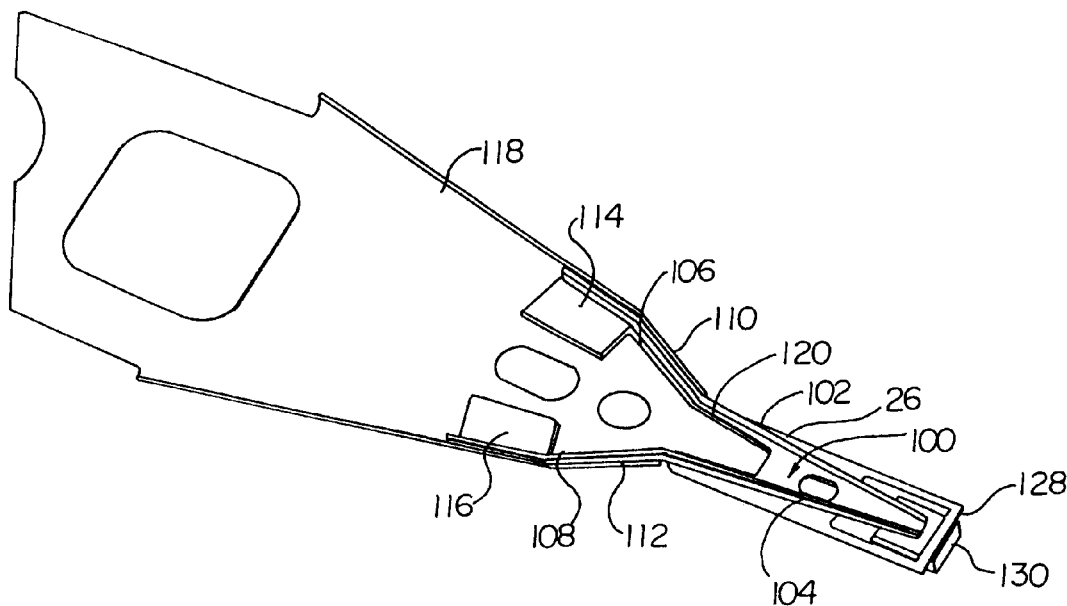
FIG. 6 illustrates a microactuator constructed according to the teachings of the present invention.
Figure 7:
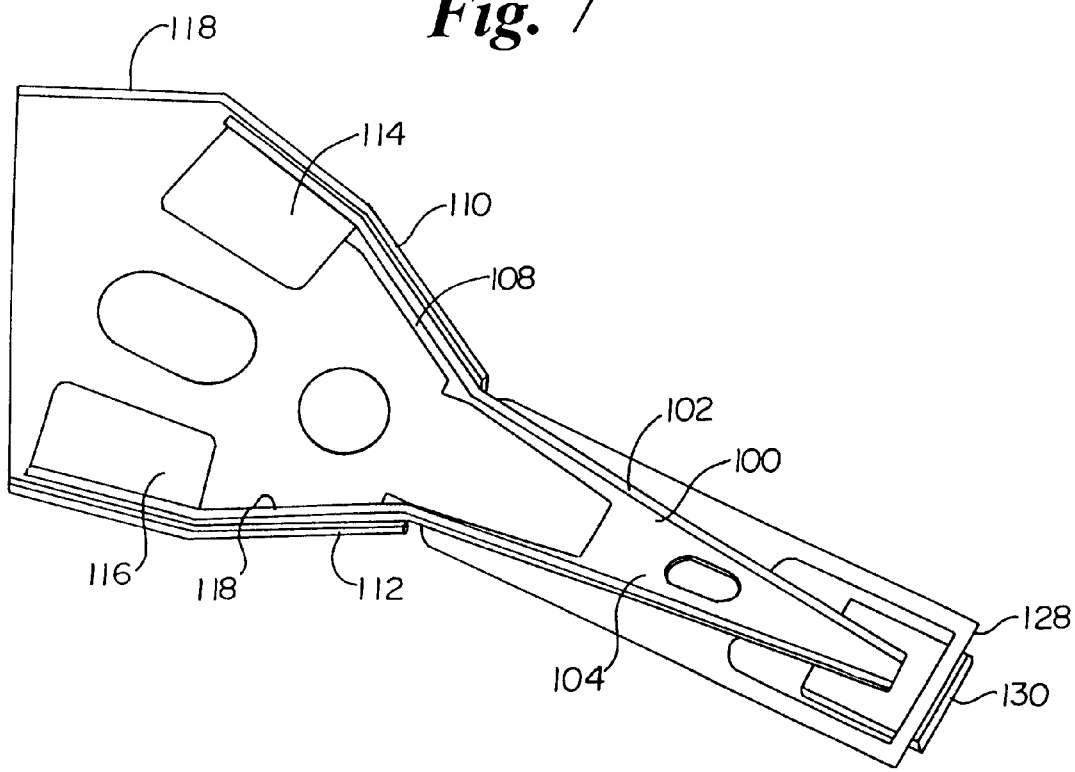
FIG. 7 is a more detailed view of a microactuator constructed according to the teachings of the present invention.
Figure 8:
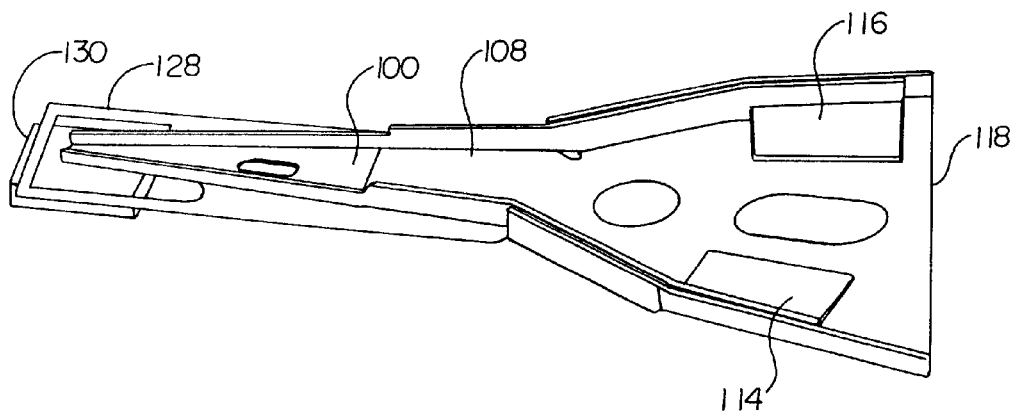
FIG. 8 is a side view of a microactuator constructed according to the teachings of the present invention.

FIG. 6 illustrates a dual monomorph structure created from an etched sheet of stainless steel 100 by forming side rails 102 and 104 up normal to the sheet 100, bending their extending tabs 106 and 108 outwards to a specific angle, and bonding piezoelectric elements 110 and 112 to them. Large flat pads 114 and 116 at the end of these monomorph sections allow the microactuator 26 to be spot-welded to a modified load beam 118. The loadbeam 118 has a formed protrusion 120 which contacts a dimple 122 on the center beam 124 of the microactuator at the 'virtual pivot' location, helping to transmit the preload force.

A shortened, gimbal or flexure sheet 126 is spot-welded to the flat center section 124 of the resulting U-channel beam. To the end 128 of the gimbal or flexure sheet 126 there is glued the slider or head 130, which gimbals on a dimple as per current practice. Not shown in FIG. 6 is a flex circuit, which carries the electrical signals to and from the head 130, and carries the control voltage to the piezo elements 110 and 112. Only a single wire is attached to each monomorphs, with the suspension acting as the ground return. Opposite-poled regions on the piezo crystals 110 and 112 produces the opposite curvatures necessary at the base of the monomorphs.

In a particular version of the design, 70×16×4 mil piezoelectric elements 110 and 112 are bonded to a 3-mil thick stainless steel sheet 100. This sheet 100 has partially-etched lines etched into it along the fold lines of the forming operations, to improve the locating of these forms, reduce their bend radii, and lower the stresses involved during forming. The sheet 100 also has tooling holes etched into it, for manufacture, and slots in the side rails to allow the flex circuit to pass from the inside to the outside of the channel.

Though the piezo elements 110 and 112 are 16 mil high, the microactuator only increases the total z-height of the suspension by 2 mil, as the elements extend down to the plane of the bottom surface of the suspension loadbeam 188. The z-height increase can be avoided, at the expense of microactuator force and bandwidth.

Figure 9A:
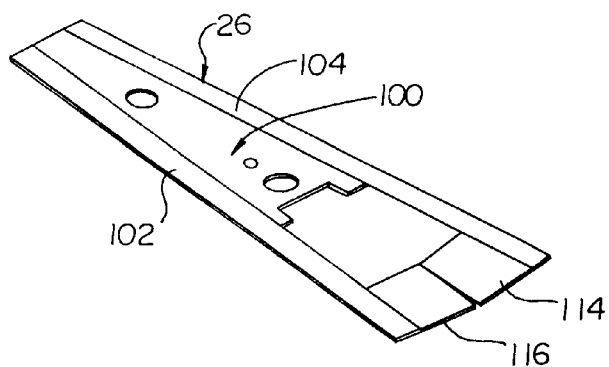
Figure 9B:
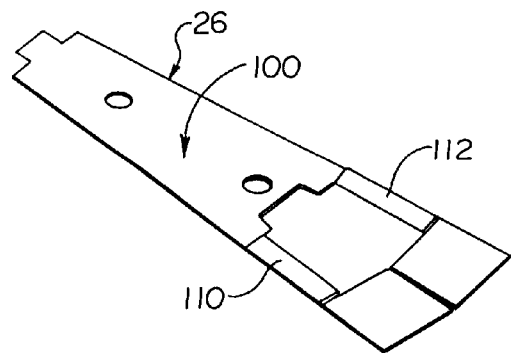
Figure 9C:
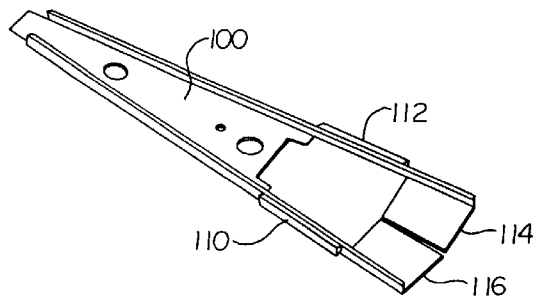

Construction of the microactuator is described in detail with reference to FIGS. 9A to 9G. A 2.5–3 mil thick stainless steel sheet 100 is etched into the shape shown in FIG. 9A, and then has two piezo crystals (3–4 mil thick) epoxy-bonded to the reverse side of its narrow beam sections 106 and 108 of the side strips (FIG. 9B). These side strips 106 and 108 are then formed up normal to the plane of the sheet 100, folding along partially-etched lines (FIG. 9C). Dimples at the head and virtual pivot locations are formed in the same step. The forming die for this operation has reliefs cut into it at the locations of the piezo elements 110 and 112 so that they are not damaged in this operation.

Figure 9D:
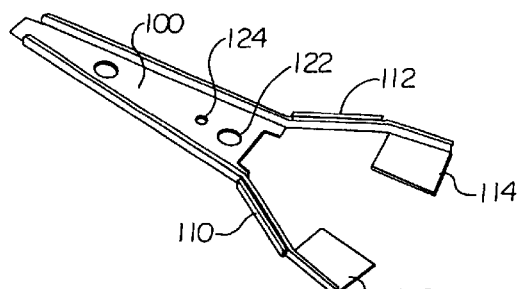

Next, the vertical rails 106 and 108 are formed into a flattened 'Z'-shape (FIG. 9D). This is a critical step, in that it must be performed in such a manner that the piezo elements 110 and 112 are not damaged by the stress fields generated during the forming.

Figure 9E:
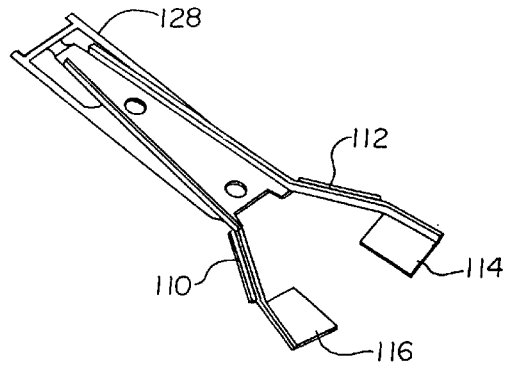
Figure 9F:
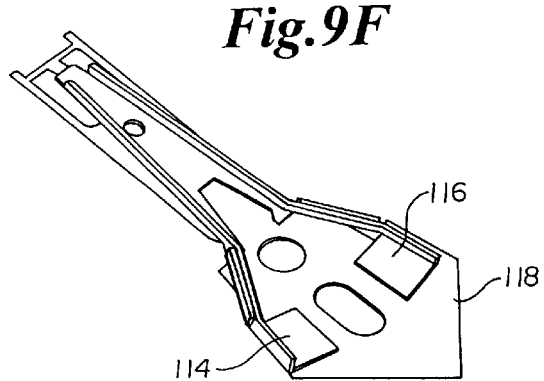

The next step is for the gimbal tongue or flexure plate 126 to be spot-welded to the bottom of the flat center beam section 124, using the tooling holes on both sheets for alignment (FIG. 9E). The microactuator structure having the gimbal plate 126 is then spot-welded to the end of a modified suspension loadbeam 118, via the large flat pads 114 and 116 on the ends of the monomorphs (FIG. 9F). The microactuator is attached to the underside of the loadbeam 118 (unless z-height restrictions prohibit this), as this allows easier assembly.

The device is then tested to ensure that it operates properly, and has not been damaged during manufacture. This is done by applying a controlled, varying voltage to the outside surface of the piezo elements 110 and 112 using very soft electrodes, and measuring the response of the structure with a laser doppler vibrometer (LDV), or other displacement-measurement method. The data recorded here can also be used as inputs for the plant constants for the servo control system.

Figure 9G:
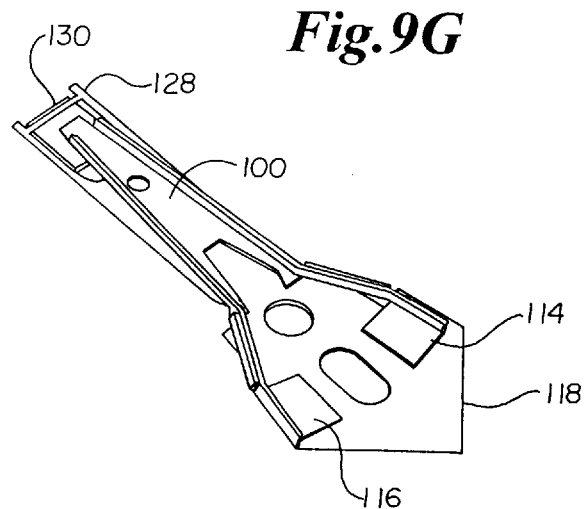

If operating properly, the microactuator then has a slider or head 130 glued onto the gimbal tongue 126 at the end 128 (FIG. 9G). A flex circuit is then laid down on top of it. The flex circuit has wires which branch off either side of its main wire group to supply the control voltage to the piezo elements 110 and 112. These single wire offshoots are bent over the vertical rails 106 and 108 to be soldered to the outer face of the piezo elements 110 and 112. This is performed when the wires connecting to the head are attached.

Figure 10:
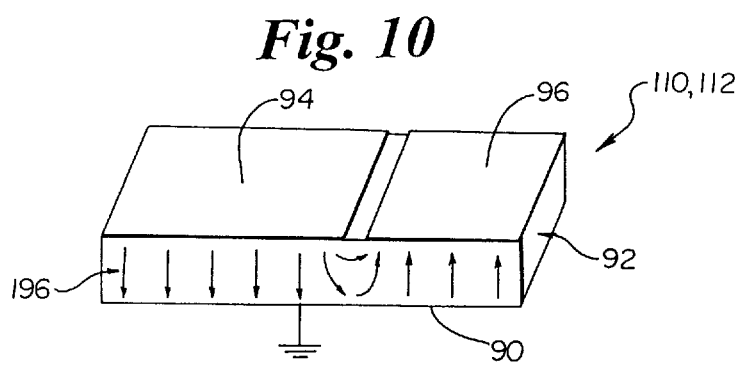
FIG. 10 illustrates a dual-electrode piezo element with poling directions shown.

The piezo elements 110 and 112 are fabricated with a continuous conductive layer 90 deposited on one side of the piezo electrical material 92, and with two separate conducting pads 94, 96 photolithographically patterned on the other side as shown in FIG. 10. These pads 94, 96 are used to apply the electric fields necessary to create the opposing poling vectors 196 in the two ends of the device.

Figure 11:
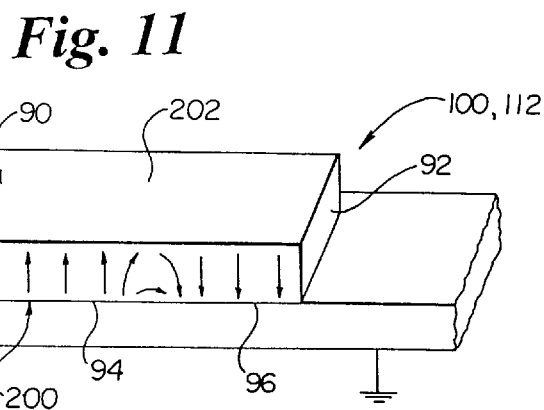
FIG. 11 illustrates a piezo element bonded to a stainless steel sheet.

When the element is bonded, using a conductive epoxy 200, to the stainless steel sheet 106, 108, these two pads 94, 96 are on the inside and so are shorted together as seen in FIG. 11. A single flex-on wire 202 for drive current is then attached to the top of the piezo element 110 and 112 to supply the drive voltage. The return path is through the suspension 118, which is grounded. The drive current for both piezo elements 110 and 112 is only approximately 0.3 mA with a bandwidth of only a few kiloHertz, so that the electrical noise produced by passing this current through the ground circuit is not be excessive.

Figure 12:
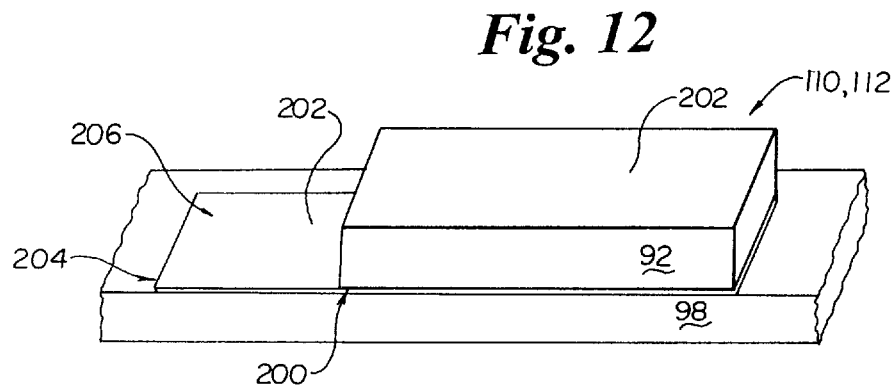
FIG. 12 illustrates a thin insulative layer covered by a thin conductive layer deposited on the steel sheet before the piezo element is bonded thereon.

If this is not the case, then a thin insulative layer 204 covered by a thin conductive layer 206 is deposited on the sheet steel 98 before the piezo element 110, 112 is bonded on. This insulating/conducting sandwich created by layers 204 and 206 would protrude from beneath the piezo element 110 and 112 so that a wire 202 for the drive voltage is connected to the conductive layer 206 as seen in FIG. 12.

Finite Element modeling, supported by analytical calculations, indicates that the structure has a resonant frequency of the order of 6 kHz while producing a displacement of ±1 micron (40 microinches) with a peak force of 3.3 mN. The deflection of the structure due to the preload is approximately 0.5 mil.

The mass of the microactuator is approximately 11 mg, and is almost equal to the mass of the portion of the loadbeam removed. Hence the microactuator should not degrade the suspension of E-block arm dynamics, especially when the structure has been optimized for this application.

The motion produced by the microactuator can be increased by a number of means, including by use of a superior piezoelectric material, a wider suspension, allowing a larger microactuator, a thinner glue layer, and use of bimorph or piezo-metal-piezo sandwich instead of a monomorph. A motion of ±20 microns is achievable if all of these are implemented at once, though this could increase the cost of the device.

The operation of the microactuator is described in principle. Voltages applied to the piezo elements cause them to bend to shape shown in FIG. 13. Their curvature is transformed into a rotation of the center beam to which the head is attached. This rotation causes a lateral, cross-track movement of the head. A drive voltage of ±36 V produces a displacement range of approximately ±1 $\mu$m. This voltage should be achievable with a small (3–4%) increase in circuitry on the servo driver chip.

The displacement of the microactuator structure approaches zero near the 'virtual pivot' location, which is where the loadbeam protrusion contacts the center beam dimple (to support the microactuator against the preload force). There is rotation at this point, but no translation. This is significant, because the absence of sliding contact means that there is no wear at this point. In reality, there will be some relative motion due to manufacturing tolerances of the microactuator, but the resulting displacements and wear should be minimal.

Figure 13:
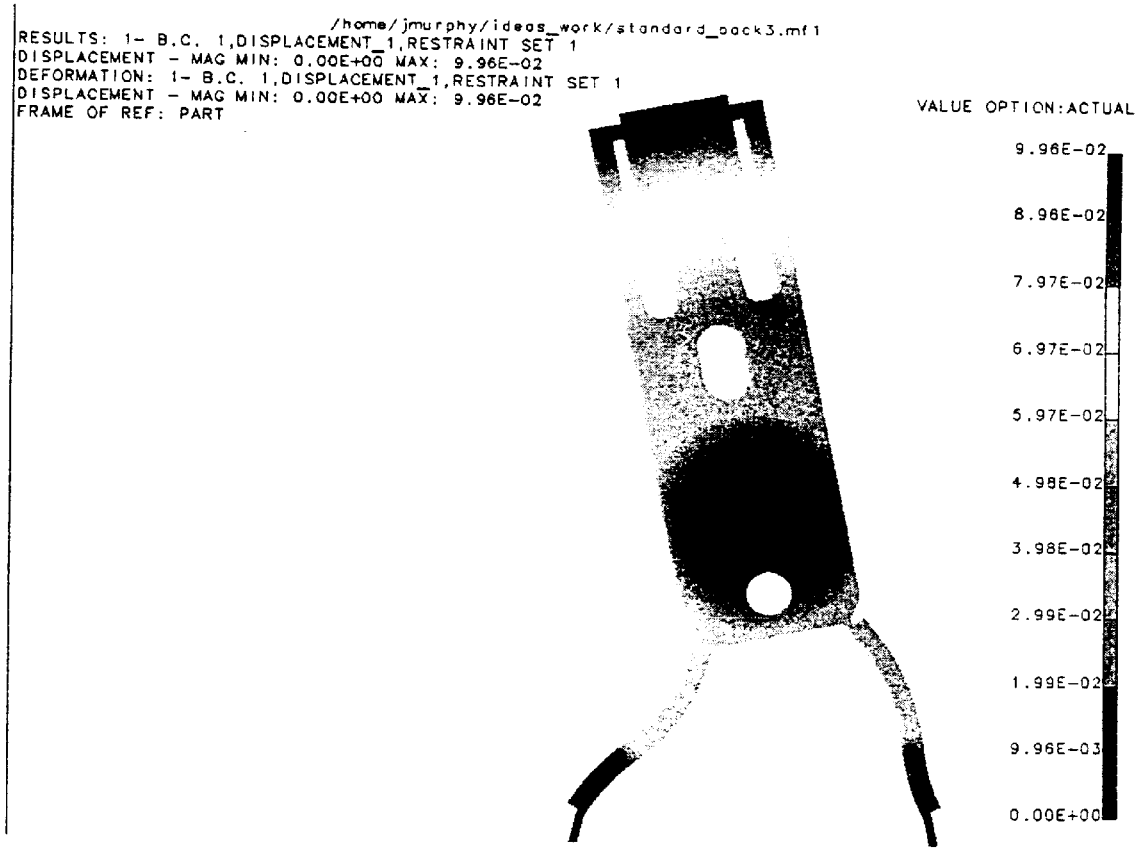
FIG. 13 is a plan view of the microactuator imposed upon a graph of displacement values that illustrates a first resonant mode shape for the microactuator from Finite Element Modeling.

The deformation shape shown in FIG. 13 is produced by having two sections of the monomorph bend in opposite directions. This is produced with a single piezo element and a single driving voltage by having the two sections of the piezo element poled in opposite directions. 'Poling' is an important fabrication process in which the asymmetric electrostatic domains of the piezo crystal are partially aligned through the application of a strong electric field at an elevated temperature, causing a permanent elongation of the material. Thereafter, the response of the piezo element is determined by the relative orientation of the poling vector and the applied electric field. An electric field in the same direction as the poling vector causes an increase in domain alignment, and hence further elongation of the crystal, while an electric field in the opposite direction causes a decrease in domain alignment, and enhance a contraction of the piezo element. Opposing fields should not exceed 40% of the maximum positive field, or the material could be 'depoled', leading to the destruction of the domain alignment and hence the functionality of the device.

The invention includes the following features:

1. Operates at the flexure plate or gimbal level, instead of the head-, swage hole- or E-block arm-level.

2. Is based upon a formed sheet-metal structure, with out-of-plane members.

3. Utilizes piezoelectric monomorphs, instead of linearly-extending elements.

4. Arranges these monomorphs to intersect, such that only the desired rotation can be significant.

5. Uses counter-bending sections on the monomorphs to accommodate their rigidly-mounted ends.

6. Uses a single piezo element with different poling directions at either end to produce these two opposing curvatures.

7. Transmits the preload force at the center of rotation, so that friction and wear are not a problem.

Conclusion

This concludes the description of the preferred embodiment of the invention. The following describes some alternative embodiments for accomplishing the present invention.

For example, any number of different types of disk drives could be used with the present invention. Those skilled in the art will recognize that the present invention could be applied to both magnetic and optical disk drives.

In another example, data storage devices having different structures and components from those described herein could benefit from the present invention. Those skilled in the art will recognize that the head-arm assembly could have a different structure from that disclosed herein without departing from the scope of the present invention. Those skilled in the art will recognize that the present invention could be used with heads that only read, but do not record. Those skilled in the art will also recognize that the present invention could be used to position optical heads rather than magnetic heads.

In summary, the present invention discloses a flexure or gimbal-level piezoelectric microactuator for the fine positioning of a head-arm assembly of a disk drive. The preferred embodiment microactuator is manufactured from a generally flat metal sheet structure having a central beam and two tabs extending from opposite sides of the beam. At least one layer of piezoelectric material is bonded onto each of the two tabs. Each of the two tabs is bent, with the piezoelectric layers bonded thereto, to a position substantially normal to the central beam. The tabs are then spot-welded to the rails at one end of a suspension member of the head-arm assembly. A recording head and the suspension respectively are connected to the flexure plate or gimbal. When a voltage is applied to the piezoelectric materials, deflection of the microactuator occurs, thereby positioning the recording head.

The foregoing description of the preferred embodiment of the invention has been presented for the purposes of illustration and description. It is not intended to be exhaustive or to limit the invention to the precise form disclosed. Many modifications and variations are possible in light of the above teaching. For instance, although the detailed description describes a relationship with a monomorph, there can be arguments rising, for example, one or more monomorphs or one or more bimorphs. A bimorph is a system where there are two piezo elements mounted relatively to act in opposition with each other. The mounting is relative to, for instance, to a steel substitute or base, and the piezo elements can be located so that there is one on either side of the base and the elements are located such that the plate is sandwiched between them. In a different form the two piezo elements are mounted on each other and the pair are then mounted to one side of the base plate.

It is intended that the scope of the invention be limited not by this detailed description, but rather by the claims appended hereto.

What is claimed is:

1. A data storage device, comprising:
   (a) one or more recording surfaces for storing data thereon;
   (b) one or more head assemblies for accessing data stored on the recording surfaces, each of the head assemblies including a first stage positioner and a second stage positioner, wherein the first stage positioner provides for coarse positioning of a head assembly relative to the recording surface and the second stage positioner provides for fine positioning of the head assembly relative to the recording surface, the second stage positioner comprising two monomorphs, each monomorph having a deflecting end wherein the deflecting ends intersect at a pivot point;
   (c) a servo system for positioning the head assemblies relative to the recording surfaces, wherein the servo system controls both the first stage positioner and the second stage positioner; and
   (d) a lever arm, attached to the pivot point, that converts rotational movement about the pivot point into translational movement of the head assembly.

2. The data storage device of claim 1, wherein the first stage positioner positions the head assembly in a vicinity of the data stored on the recording surface and the second stage positioner precisely aligns the head assembly.

3. The data storage device of claim 1, wherein the recording surfaces comprise disks having one or more tracks thereon, the first stage positioner positions the head assembly in a vicinity of a desired track storing the data, and the monomorphs position the head assembly in a range of movement of at least half a width of the desired track.

4. The data storage device of claim 3, wherein the resolution of movement is on a nanometer scale.

5. The data storage device of claim 3, wherein the range of movement comprises distances of at least ±0.5 $\mu$m for a track pitch of approximately 1 $\mu$m.

6. The data storage device of claim 1, wherein voltages are applied to cause the monomorphs to expand or contract, thereby creating a bending motion in the monomorphs and deflection of said lever arm attached to one end of the pivot point.

7. The data storage device of claim 1, wherein an inactive or counter-bending section is attached to another end, of said lever arm the expansion or contraction caused by voltages being applied to the monomorphs causes a curvature, the curvature produces a deflection in the lever arm, and the inactive or counter-bending section produces a counter-curvature.

8. The data storage device of claim 1, wherein the first stage positioner is comprised of an arm and a suspension member, and a flexure element monomorph, the mounted on an end of the suspension member and are connected with the flexure element, and a reading and/or recording head is mounted on an end of the flexure element.

9. The data storage device of claim 1, wherein the two monomorphs are constructed from a metal sheet having two bent-up tabs on to each of which a piezoelectric element is attached.

10. The data storage device of claim 9, wherein the tabs are attached to a suspension member.

11. The data storage device of claim 9, wherein the two monomorphs are aligned on either side of a center microactuator beam between the tabs.

12. The data storage device of claim 11, wherein one or more head assemblies are attached to an end of the flexure element, and an opposite end of the flexure element is attached to the center microactuator beam.

13. The data storage device of claim 9, wherein opposite poling on each end of the piezoelectric elements produces curvature in the tabs to effect the movement of the one or more head assemblies.

* * * * *